(12) United States Patent
Collombet et al.

(10) Patent No.: US 12,078,457 B2
(45) Date of Patent: Sep. 3, 2024

(54) DEVICE FOR PROTECTING STATIC OR MOBILE LAND, SEA OR OVERHEAD STRUCTURES AGAINST THE BLAST FROM AN EXPLOSION OR DETONATION AND ASSOCIATED PROJECTIONS OF MATERIAL

(71) Applicants: UNIVERSITÉ TOULOUSE III—PAUL SABATIER, Toulouse (FR); COMPOSITES EXPERTISE & SOLUTIONS, La Penne-sur-Huveaune (FR); COMMISSARIAT A L'ENERGIE ATOMIQUE ET AUX ENERGIES ALTERNATIVES, Paris (FR)

(72) Inventors: Francis Collombet, Toulouse (FR); Yves-Henri Grunevald, Le Beausset (FR); Alain Rouquand, Gramat (FR)

(73) Assignees: UNIVERSITE TOULOUSE III—PAUL SABATIER, Toulouse (FR); COMPOSITES EXPERTISE & SOLUTIONS, La Penne-sur-Huveaune (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 92 days.

(21) Appl. No.: 17/776,412

(22) PCT Filed: Nov. 19, 2020

(86) PCT No.: PCT/EP2020/082747
§ 371 (c)(1),
(2) Date: May 12, 2022

(87) PCT Pub. No.: WO2021/104998
PCT Pub. Date: Jun. 3, 2021

(65) Prior Publication Data
US 2022/0404124 A1     Dec. 22, 2022

(30) Foreign Application Priority Data

Nov. 27, 2019   (FR) ...................................... 1913335

(51) Int. Cl.
*F41H 7/04*     (2006.01)
*F41H 5/013*    (2006.01)
*F41H 5/04*     (2006.01)

(52) U.S. Cl.
CPC ............ *F41H 7/042* (2013.01); *F41H 5/013* (2013.01); *F41H 5/0442* (2013.01)

(58) Field of Classification Search
CPC ......... F41H 7/042; F41H 5/013; F41H 5/0442
See application file for complete search history.

(56) References Cited

U.S. PATENT DOCUMENTS

| 8,640,594 | B2 * | 2/2014 | Treadway ............... F41H 7/042 |
| | | | 89/929 |
| 2003/0159575 | A1 * | 8/2003 | Reichman ............. F41H 5/0442 |
| | | | 89/36.02 |

(Continued)

FOREIGN PATENT DOCUMENTS

| DE | 4011963 | A1 | 10/1990 |
| DE | 19913845 | A1 | 9/2000 |

(Continued)

OTHER PUBLICATIONS

English translation of the Written Opinion of the International Searching Authority dated Feb. 1, 2021 for corresponding International Application No. PCT/EP2020/082747, filed Nov. 19, 2020.

(Continued)

*Primary Examiner* — Joshua E Freeman
(74) *Attorney, Agent, or Firm* — David D. Brush; Westman, Champlin & Koehler, P.A.

(57) ABSTRACT

A device for protecting a mobile or static structure against the blast from an explosion or detonation and associated (Continued)

projections of material. The device includes a protective casing made of several materials, the protective casing being located at a distance from the structure to be protected and connected to the structure by an elastomer connection. The protective casing is elastically deformable so as to be able to deform elastically for the duration of the stress by oscillating to spread the energy of the blast from the explosion over its surface and over time in several directions, and then to return completely or partially to its original shape after a period of time.

12 Claims, 7 Drawing Sheets

(56) References Cited

U.S. PATENT DOCUMENTS

| | | | |
|---|---|---|---|
| 2007/0186762 A1 | 8/2007 | Dehart et al. | |
| 2010/0101404 A1* | 4/2010 | Lorenzo | E04H 9/10 89/36.04 |
| 2012/0186428 A1* | 7/2012 | Peer | F41H 7/042 89/929 |
| 2014/0318359 A1* | 10/2014 | Asaf | F41H 5/007 89/36.08 |
| 2021/0215459 A1* | 7/2021 | Chen | F41H 5/0492 |

FOREIGN PATENT DOCUMENTS

| | | |
|---|---|---|
| EP | 1464915 A1 | 10/2004 |
| WO | 2010090661 A1 | 8/2010 |

OTHER PUBLICATIONS

International Search Report dated Jan. 21, 2021 for corresponding International Application No. PCT/EP2020/082747, Nov. 19, 2020.
Written Opinion of the International Searching Authority dated Jan. 21, 2021 for corresponding International Application No. PCT/EP2020/082747, filed Nov. 19, 2020.

* cited by examiner

DEVICE FOR PROTECTING STATIC OR MOBILE LAND, SEA OR OVERHEAD STRUCTURES AGAINST THE BLAST FROM AN EXPLOSION OR DETONATION AND ASSOCIATED PROJECTIONS OF MATERIAL

CROSS-REFERENCE TO RELATED APPLICATIONS

This Application is a Section 371 National Stage Application of International Application No. PCT/EP2020/082747, filed Nov. 19, 2020, which is incorporated by reference in its entirety and published as WO 2021/104998 A1 on Jun. 3, 2020, not in English.

FIELD OF THE INVENTION

The technical field of the invention is that of devices for protecting static or mobile land, sea or overhead structures against explosions or detonations and the associated projections of material, such as explosions of buried mines, for example.

More particularly, the present invention relates to devices for ensuring the protection of any physical body in contact or not with a floor of a land vehicle, such devices being arranged between the floor of a land vehicle and an explosive device.

Such protective devices can also ensure the protection of a vertical face of a structure and in these cases constitute a lateral protection. Finally, they can be placed on the upper face (for example, a roof) in the case of a threat from a detonation located above the system to be protected (for example, an overhead detonation).

PRIOR ART

As an example, in the case of armed conflicts, military land vehicles, such as armoured vehicles, are threatened by explosive devices, such as mines, designed to cause damage to the military land vehicle and to its occupants notably due to the blast caused by the detonation of the explosive devices and shrapnel, and more generally to all associated projections.

More specifically, the detonation of a mine located under a military land vehicle produces blast-type shock waves that can puncture the floor of the military land vehicle, directly exposing the occupants of the military land vehicle to the blast pressure and the intense heat generated by the explosion, as well as to associated projections.

To protect the passengers of a military land vehicle from death or serious injury when their vehicle is subjected to a mine explosion, it is known to protect the floor of the land vehicle by placing an armour or an overprotection underneath it.

This overprotection can consist of a metal casing placed between the threat (placed on or buried in the ground) and the floor of the military land vehicle, at a distance from the latter, the casing partially absorbing the energy produced by the blast from the mine explosion.

One embodiment of this overprotection is described in the American patent U.S. Pat. No. 8,640,594.

In some cases but not always, the casing partially absorbs the energy produced by the blast from the mine explosion through the principle of plastic deformation, for example.

However, this solution notably has one disadvantage. Indeed, the overprotection is made of metal. This results in a large mass of the overprotection that penalises the mobility of the vehicle.

The overprotection can be used to deflect the blast from the explosion, and in this case may have a cross-sectional profile having the general shape of a V, with the apex of the V pointing in a direction towards the explosion blast.

An embodiment of this type of overprotection is described in the American patent US 2007/0186762. However, this solution also notably has some disadvantages. Indeed, it does not support the significant absorption of energy, for example by plastic deformation, because its geometry gives it an additional rigidity (triangulation principle in mechanics). The same is true for elastic deformation. To integrate such a V-shaped overprotection under the vehicle while keeping the same ground clearance, the overall height of the vehicle most of the time needs to be increased. Such a V-shaped profile favours a concentration of stresses at the edge of the V, which therefore needs to be reinforced. Finally, the stress is pulsed and can be broken down into two parts, the first part consisting of a shock wave resulting, for example in the case of a buried mine, from the arrival at supersonic speeds of a densified fluid constituted by the ejecta and projections (duration of a few tens of microseconds and a pressure peak of several hundred bars) A second part constituted by an overpressure wave resulting from the expansion of gases at very high temperatures generated by the detonation (duration of a few hundred microseconds and pressure peak of several tens of bars). The first part being purely pulsed, the shock wave is transmitted to the overprotection and thus to the system to be protected before the flow is deflected. The shape therefore only comes into play in the second part of the stress and, in any case, in a rather reduced way.

The overprotection is classically attached to the vehicle by a set of mechanical connecting parts, such as deformable blocks, articulated panels, cylinders, links and/or ball joints, partly absorbing the energy produced by the blast from the mine explosion. However, this set of parts is subject to malfunctions, such as alignment problems, and stresses, such as corrosion. On the other hand, this set of parts does not prevent the transmission of a significant part of the shock wave of the military land vehicle and particularly to the floor.

The purpose of the invention is to propose a protective device to overcome such disadvantages.

SUMMARY OF THE INVENTION

The purpose of the invention is a device for protecting a mobile or static structure against the blast from an explosion or detonation and associated projections of material, comprising a protective casing made of several materials, said casing being located at a distance from the structure to be protected and connected to said structure by elastomer connecting means, said protective casing being elastically deformable so as to be able to deform elastically for the duration of the stress by oscillating to spread the energy of the blast from the explosion over its surface and over time in several directions, and then to return completely or partially to its original shape after a period of time.

This period of time is in the order of a few tens of milliseconds.

Partial return to its original shape means that the protective casing may undergo an irreversible deformation.

To connect the protective casing to the mobile or static structure, which may be a military land vehicle, connecting elements, for example roll-shaped, made of elastomer, for example silicone, are proposed. These connecting elements allow the rotation and translation of the protective casing in all directions. The elastomer constituting the connecting elements is subjected to an elastic deformation that can adapt at any time to the geometry and position of the overprotection. Because of its low stiffness, it also constitutes an additional delay filter, the shock wave moving in a material at a speed proportional to the stiffness of said material (thus here approximately 3 times slower than in the overprotection). The solution of the invention avoids the implementation of a connection mechanism likely to malfunction (no corrosion, no seizing, no precise alignment problem, etc.). Finally, as the system can easily be dismantled in case of ageing for any reason, the elastomer connecting element(s) concerned can easily be changed. In other words, there can be no loss of performance with the solution of the invention.

The main technical function of the protective device is to cause a delay effect and to distribute the stress generated by the explosion as widely as possible, in space and time, towards the structure to be protected by choosing the most appropriate entry path.

It also aims to store a significant amount of elastic energy so it can, after a certain time, approximately 2 to 3 times the duration of the stress, i.e. approximately 1 to 2 milliseconds (for the record, at this time, the stress has been completely over for several hundred milliseconds), to generate a significant force in the opposite direction to the stress. This force can be used to cause the disengagement, for example through devices with a calibrated breaking level (for example, a shear pin), of the overprotection from the system to be protected and thus prevent any future dynamic interaction between the overprotection and the system to be protected.

When the mine explodes, the stress is initially concentrated on a reduced surface of the protective casing (the action zone of the first part of the stress) but its mechanical properties (average rigidity of a few tens of gigapascals) already allow it to have a local elastic deformation. This elastic deformation is globalised under the effect of time and of the second part of the stress. During all this time, the protective device will favour the distribution of the whole stress on the whole surface of the protection casing by creating a first delay filter favoured by a more reduced inertia compared to that of the structure to be protected.

There is no absorption of the blast stress, but a distribution of the effects of the stress on and within the overprotection to the interaction zones between the overprotection and the system to be protected.

The intrinsic structure of the protective device allows the stress to be collected and then distributed within the protective casing. In other words, the overprotection "deconcentrates" the stress (i.e. "decreases its concentration") to spread it out in time and space.

This distribution is done in a multimodal way: the protective casing is elastically deformed in a reversible way by vibrating to propagate the shock wave in several directions. To facilitate this, the protective casing is made of one or more materials with a Young's modulus that is a factor of 10 lower than that of materials of the state of the art.

The multidirectional elastic deformation of the protective casing slows down the propagation speed of these shock waves and improves their distribution in a time much greater than that necessary for the ejecta to have time to leave the zone where they could present a danger to the protected structure, its occupants and its contents.

For example, in tests conducted by the inventors, the aggregates were ejected over a period comprised between 0.2 µs and 100 µs after the explosion while the protective structure vibrated for several milliseconds (i.e., approximately 30 times longer).

The elastomer connecting elements have the remarkable characteristic of slowing down the transmission of the shock wave towards the structure to be protected and its components, for example the floor of a vehicle. There are therefore internal reflections of the shock wave within the overprotection itself: the device of the invention thus functions as a mechanism for trapping the shock wave. The transmission of the shock wave to the connecting elements is therefore delayed and occurs in small amounts of energy spread over time. The elastomer connecting elements induce a new delay which is added to the previous one. Unlike devices of the prior art, the connecting elements only weakly transmit the echo of the shock wave to the vehicle floor.

The effectiveness of the technical protection function is essentially due to its capacity to elastically deform while allowing a return of the waves that will cause the protective casing to vibrate: during the oscillations of the protective casing, the vehicle floor does not "see" anything in the sense that it is not impacted by the shock waves. These vibrations of the protective casing will filter the input signal by typically attenuating it by a factor of 5 to 20.

The invention operates without an energy dissipation mechanism. However, the protective device may also include a damping mechanism.

According to a particular approach, said casing has constituent materials with Young's moduli comprised between 1,000 and 200,000 MPa quasi-statically.

According to a particular embodiment of the invention, said protective casing consists of a multilayer structure.

Advantageously, said protective casing comprises a first protective layer composed of several materials against the projections of materials and ejecta associated with said explosion, said first layer being intended to be oriented towards the explosion blast side.

Advantageously, said protective casing comprises at least a first layer of material having a Young's modulus comprised between 1,000 and 10,000 MPa, a first face of which facing the structure to be protected is covered by at least one structural layer and the second opposite face of which is covered by at least one other structural layer.

Advantageously, said structural layers are made of glass, basalt, aramid or carbon fibres.

According to a particular embodiment of the invention, the ends of at least one part of the material layers of said protective casing are bent.

According to a particular embodiment of the invention, the protective casing is curved in shape and is located at a distance from the part of the military land vehicle to be protected, said protective blast having a predefined radius of curvature when no stress is applied thereto and being able to vibrate under the effect of the blast from an explosion so as to have radii of curvature different from the initial radius of curvature, and then to return completely or partially to its original shape once the blast from the explosion has dissipated.

The convex curved shape of the floor protective casing allows a movement in the direction of the stress but also in other directions (for example, horizontal in the case of a military land vehicle) in order to spread out in time and space the energy of the blast from the explosion on a structural scale and to transfer the forces to the rigid zones of the sides of the military land vehicle (side faces for a light armoured vehicle (LAV), pillars for a light vehicle, such as a light reconnaissance and support vehicle (LRSP) or a special patrol vehicle (SPV)) via the elastomer connecting means.

The arc curved shape of the protective casing promotes the lateral flow of the blast from the explosion. The geometric continuity of an arc structure enables a progressive distribution of stresses.

Furthermore, this arc shape improves the ground clearance of the military land vehicle compared to V-shaped solutions.

In an embodiment variant, the protective casing has an initial flat shape and a curved geometry that evolves during stressing. However, the protective casing can have curved edges and still be flat.

The protective casing is a combination of superimposed layers of composite material arranged according to a defined architecture, able to withstanding the forces generated by the explosion of a given mine (for example an 8 kg NATO mine).

Composites, by their performance and lightness, offer optimal protection capabilities without penalising the total mass of the military land vehicle, and thus its mobility.

By distributing the forces of the explosion and deflecting the mine shrapnel to the sides of the military land vehicle, damage to the military land vehicle is minimised. Much of the blast load from the explosion is distributed into the protective structure of the military land vehicle in a relatively uniform manner. Thanks to this device, the accelerations transmitted to the floor of the military land vehicle are notoriously reduced (by a factor of 5 to more than 20), which reduces the risk of major trauma. Thus, the survivability of the crews is greatly improved.

Advantageously, the elastomer connecting means are made of silicones, of synthetic or natural rubbers, and the overprotection is held in place only on these elastomer supports.

Advantageously, said casing is held on the elastomer connecting means by means of removable devices, possibly having a calibrated breaking level.

Thus, said overprotection can be easily removed from said structure to be protected and from said elastomer supports.

Advantageously, the means for maintaining said overprotection can cut off automatically beyond a certain level of stress, once the overprotection releases the elastic energy stored during said stress, i.e. once the stress has ended.

Advantageously, the elastomer connecting means are continuous or spaced supports extending at the periphery of the casing.

According to a particular aspect of the invention, the connecting elements are in the form of a beam or of juxtaposed blocks that are square or rectangular in cross section, for example.

In a particular but non-restrictive embodiment, the invention applies to the protection of a part of a military land vehicle.

The invention also proposes a device for protecting a part of a military land, sea (such as a ship or submarine) or overhead vehicle from damage associated with damaging events, such as mine explosions or other explosive devices.

The protective device can be used to protect a military land vehicle against the blast from an explosion, with or without projection of materials, occurring underneath the military land vehicle. In this case, it is arranged under the floor of the military land vehicle so as to protect the occupant(s) of the military land vehicle by avoiding, in the particular case of this implementation, the vertical movements of the floor, that cause important trauma to the occupants (at the lower limbs in particular).

In the case of a vertical structure to be protected, it is understood that the protective device prevents horizontal movements of said vertical structure.

PRESENTATION OF THE FIGURES

Other characteristics and advantages of the invention will emerge upon reading the following description, provided as a non-restrictive example and referring to the annexed drawings, wherein.

Figure 7:
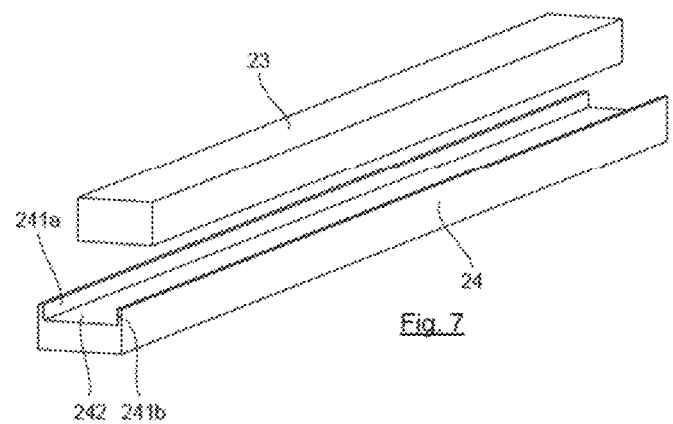
Figure 8:
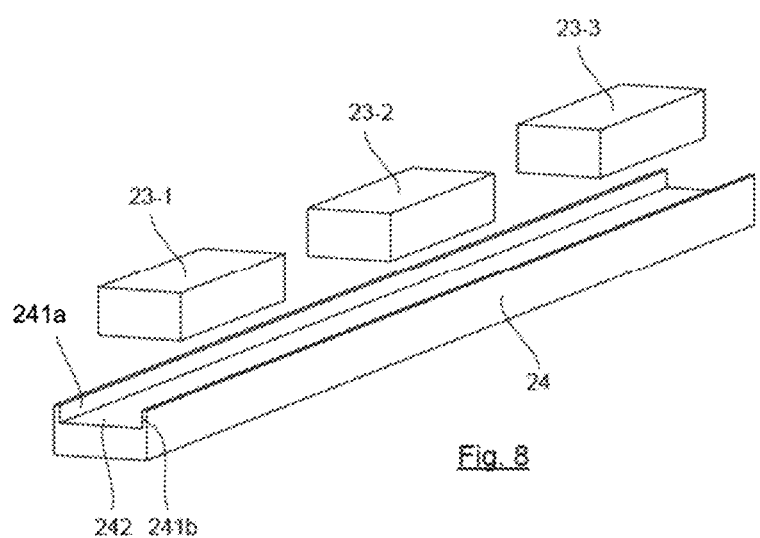
Figure 9:
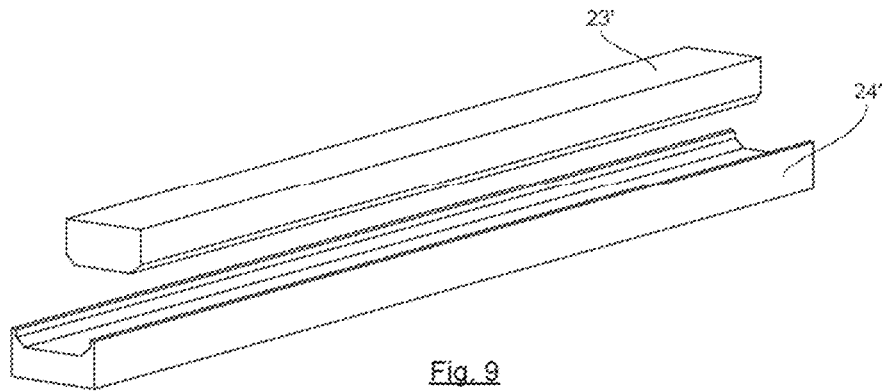
Figure 10:
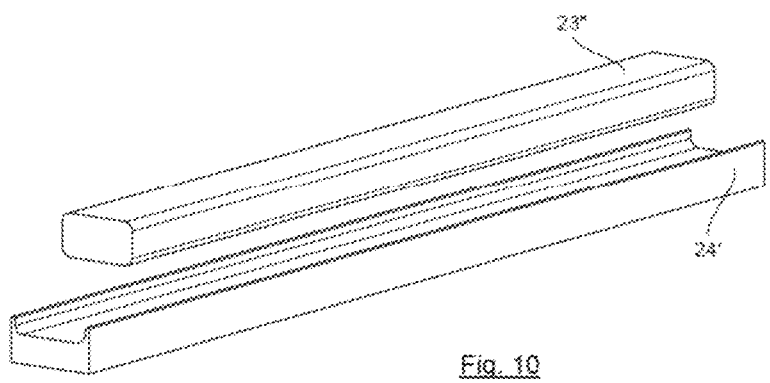
Figure 11:
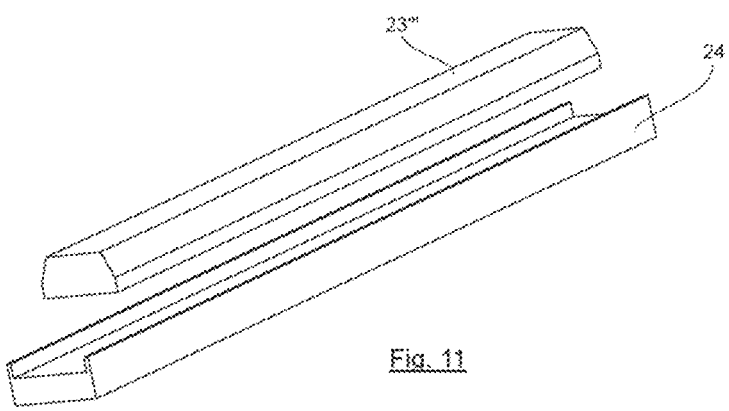
Figure 12:
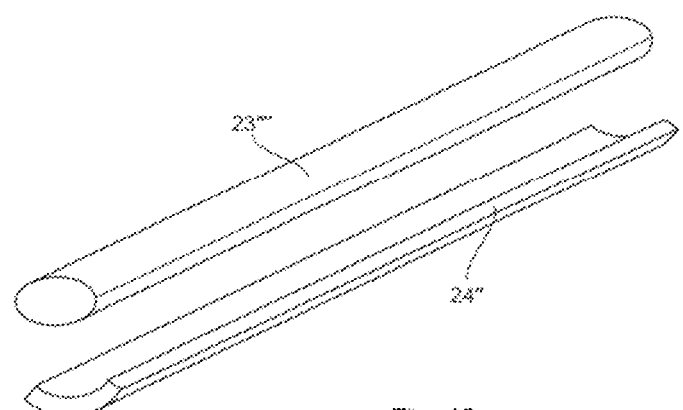
Figures 13A, 13B:
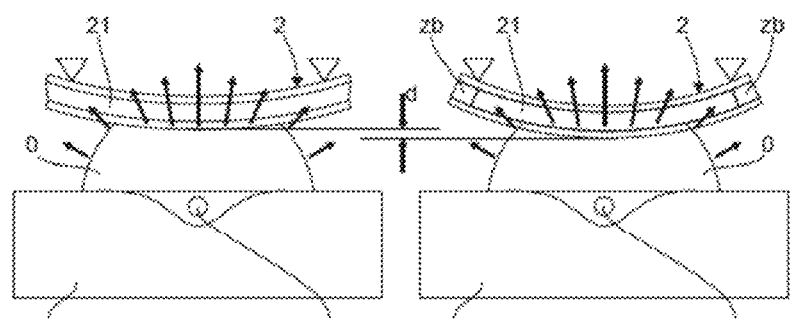
Figure 14:
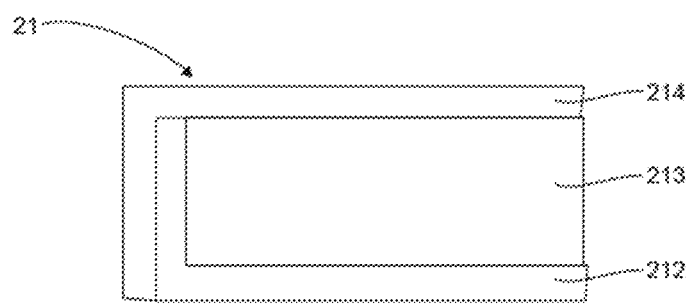
Figure 15:
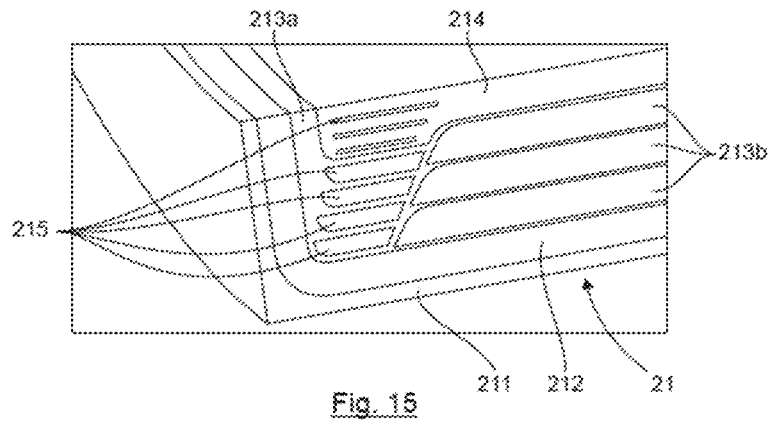
Figure 16:
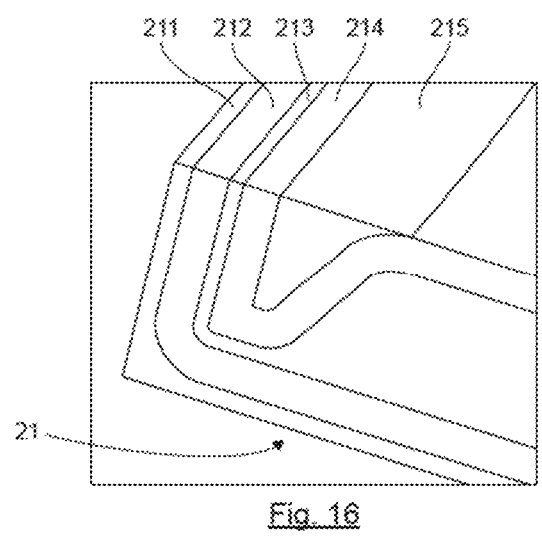
Figure 17:
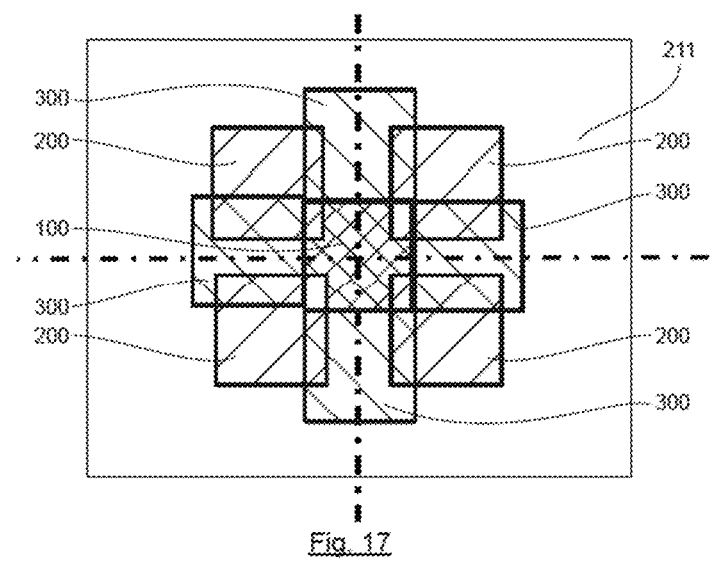
Figure 18:
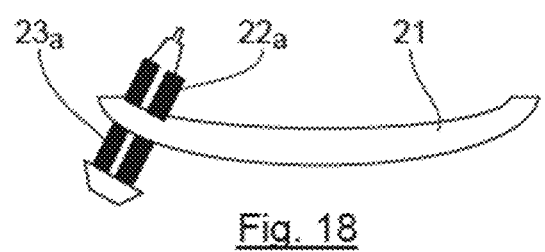

FIG. 7 diagrammatically shows a first example of elements for connecting and attaching a protective device to a vehicle;

FIG. 8 diagrammatically shows a second example of elements for connecting and attaching a protective device to a vehicle;

FIG. 9 diagrammatically shows a third example of elements for connecting and attaching a protective device to a vehicle;

FIG. 10 diagrammatically shows a fourth example of elements for connecting and attaching a protective device to a vehicle;

FIG. 11 diagrammatically shows a fifth example of elements for connecting and attaching a protective device to a vehicle;

FIG. 12 diagrammatically shows a sixth example of elements for connecting and attaching a protective device to a vehicle;

FIG. 13A is a side diagrammatic representation of a protective casing without edge under the effect of the shock wave produced by the blast from the explosion of a mine buried in the ground;

FIG. 13B is a side diagrammatic representation of a protective casing with anti-delamination edging zones under the effect of the shock wave produced by the blast from the explosion of a mine buried in the ground;

FIG. 14 is a detailed side cross-sectional diagrammatic representation of a first solution for edging the protective casing compliant with the invention;

FIG. 15 is a detailed side diagrammatic representation of a second solution for edging the protective casing compliant with the invention;

FIG. 16 is a detailed perspective diagrammatic representation of a third solution for edging the protective casing compliant with the invention;

FIG. 17 diagrammatically illustrates an example of non-structural protective layers of a protective casing compliant with the invention, incorporating metal or ceramic tiles to improve puncture resistance;

FIG. 18 is a detailed side cross-sectional diagrammatic representation of an embodiment for holding the connecting elements on either side of a protective casing compliant with the invention using reversible attaching means.

DETAILED DESCRIPTION OF THE INVENTION

It will be noted that the invention is disclosed for application to a military land vehicle. However, the invention is equally suitable for military, civil and commercial sea (boats or submarines), overhead or land vehicles (such as wheeled or tracked transport vehicles). It is also suitable for any static system such as a side face or roof of a shelter or a protective wall.

Figure 1:
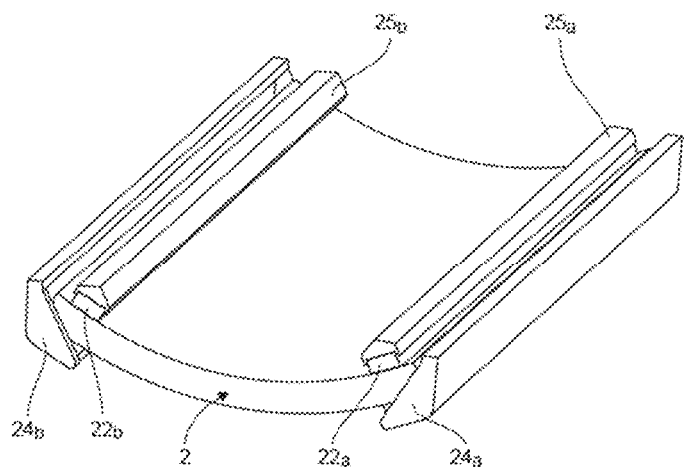
FIG. 1 is a diagrammatic representation of an advantageous embodiment of the protective device according to the invention.
Figure 2:
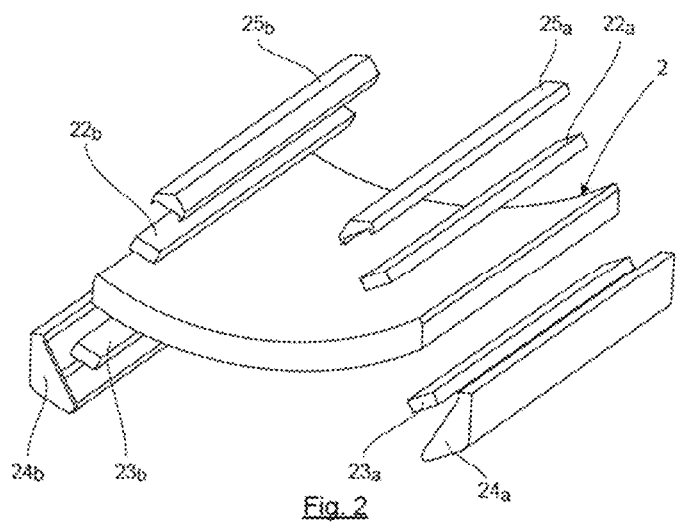
FIG. 2 is an exploded diagrammatic representation of an embodiment of the protective device according to the invention.
Figure 3:
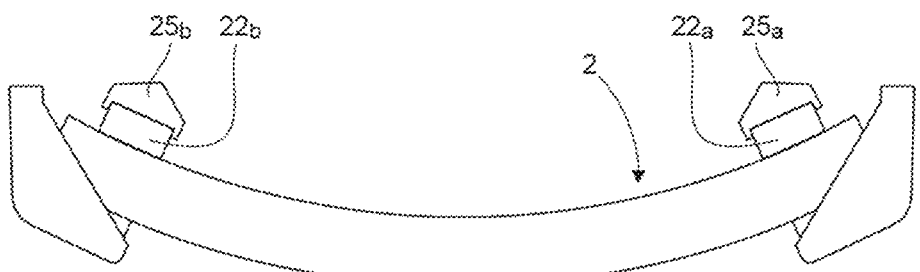
FIG. 3 is a cross-sectional diagrammatic representation of an embodiment of the protective device according to the invention.

FIGS. 1 to 3 represent a mine protection device 2 according to one embodiment of the invention.

Figure 4:
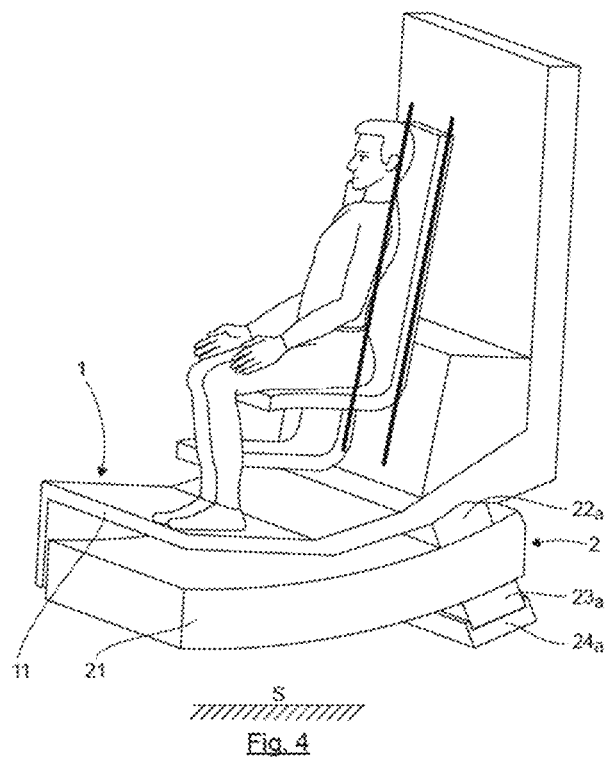
FIG. 4 is a partial diagrammatic representation of a vehicle equipped with a protective device according to the invention.

FIG. 4 partially represents a vehicle 1 equipped with a mine protection device 2. The vehicle 1 illustrated is a wheeled military land vehicle with a frame, a body and a floor 11.

A blast mine placed on the ground S generates a strong pressure on the floor 11 of the vehicle at initiation. In compliance with the invention, in order for the floor 11 to withstand the effects of the blast, a protective device 2 is provided to protect the floor 11 of the vehicle 1 above which the crew compartment is located.

In this particular case, the purpose of the protective device 2 is to protect the physical bodies (people, equipment, . . . ) located above the floor 11. In fact, it is tolerated that the floor 11 can undergo irreversible deformations. However, the bodies located on the floor 11 must suffer no damage or reduced damage. The protection must be so effective as not to allow any flames or particles to reach the passenger compartment of the vehicle 1.

This protective device 2 is in the form of a casing 21 referred to as overprotection, of curved shape in this example, located under the vehicle, between the floor 11 and the ground S. The casing 21 has a predetermined radius of curvature when no stress is applied to it.

In one variant, it can be flat, have a variable radius of curvature, with or without bent edges.

The casing 21 is attached to the vehicle 1 by means of deformable connecting elements 22a, 22b, 23a, 23b at each of its side ends. The casing 21 extends on the full width and length of the floor 11.

Figure 5:
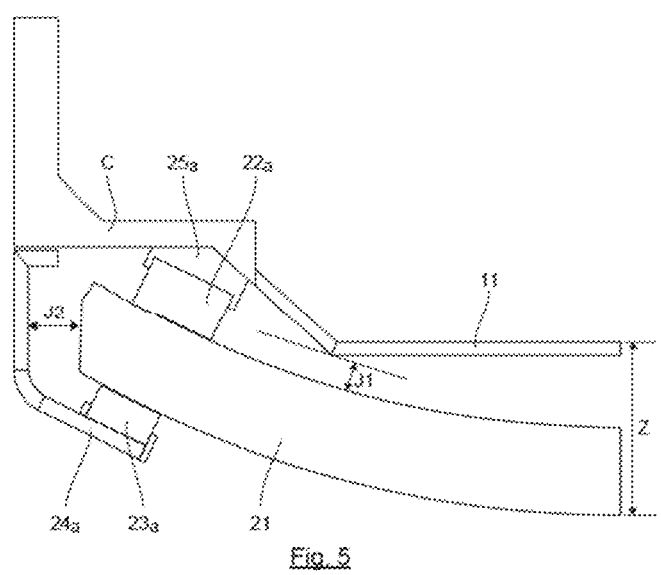
FIG. 5 is a detailed side cross-sectional diagrammatic representation of elastomer connecting means connecting a protective device compliant with the invention to a land vehicle.

In FIGS. 4 and 5, the casing 21 is partially represented and only the connecting elements 22a, 23a located at one side end of the casing 21 are illustrated. However, it is understood that connecting elements 22b, 23b are also provided at the other side end of the casing 21 as represented in FIGS. 1 to 3.

The purpose of implementing the protective device 2 is to distribute the effect of the blast from the explosion (parts one and two of the stress) as widely as possible, in space and time, by allowing an elastic deformation of it. The curved shape favours the deflection of the blast, but is not the main purpose; the curved shape is essentially intended to adjust the flexibility of the overprotection without increasing its mass. To do this, the casing 21 moves both in the direction of the stress and in other directions, without impacting the floor 11, and the energy of the explosion is transferred to the longitudinal connecting elements 22a, 22b, 23a, 23b. The casing 21 elastically deforms as it vibrates and propagates the shock wave in several directions within it. The deformable connecting elements 22a, 22b, 23a, 23b also absorb some of the energy of the impact and return the wave back to the casing 21.

The protective device 2 thus acts as a device that mitigates the violence of the impact and the destructive effects on the passenger compartment of the vehicle 1.

The casing 21 is able to oscillate under the effect of the blast from an explosion and then automatically return to its shape once the blast from the explosion has dissipated.

This protective device 2 constitutes a structural filter for protection against the blast from the explosion, with or without projection of materials. It is configured to reduce the effects of the detonation of an explosive device located in the ground (buried mine) or on the ground, such a detonation being generally brief and intense.

This protective device 2 acts as a filter to reduce the input signal, constituted by the blast from the explosion, and reduce the accelerations transmitted to the protected object, the floor 11 in the illustrated example, thus preventing any physical body placed in the example on the floor 11, from suffering serious damage. The destructive blast is a brief and intense "input signal", the slow movement of the protected structure being the "output response".

The protective device 2 for the floor 11 of the vehicle 1 comprises two main elements:

a composite casing 21, in the shape of an arc in the example in FIGS. 1 and 2, located at a distance from the object to be protected (namely, the floor 11 of the vehicle 1), and connecting elements, taking the form of beams or rolls, 22a, 22b, 23a, 23b made of elastomer, such as silicone in this example, which are integral with elements 24a, 24b, 25a, 25b for attaching or fastening the casing 21 to the vehicle 1, in the example in FIGS. 1 and 2.

The beams 22a, 22b, 23a, 23b allow the arc casing 21 to expand in the elastic domain.

The casing 21, which is made of composite material (glass fibres and plywood, for example), is light and flexible in the sense that it is deformable in the elastic domain under the range of stresses it is designed for. Advantageously, the casing has an overall Young's or elasticity modulus comprised between 1 GPa and 200 GPa.

In the example in FIGS. 1 to 5, the casing 21 has a convex shape oriented towards the ground S and is located at a distance from the floor 11. It is curved outwards in the transverse direction of the vehicle 1 and composed of a single multi-layer part.

This arc part can expand, or contract, and is able to undergo a controlled deformation under the effect of the force of an explosion, possibly to deflect the blast (but this is not essential) and to automatically return to its shape once the force has dissipated.

The casing 21 helps to attenuate, even absorb and deflect the force of the blast, i.e. the shock waves.

The casing 21 can deform without coming into contact with the floor 11 and thus without impacting it.

Figure 6:
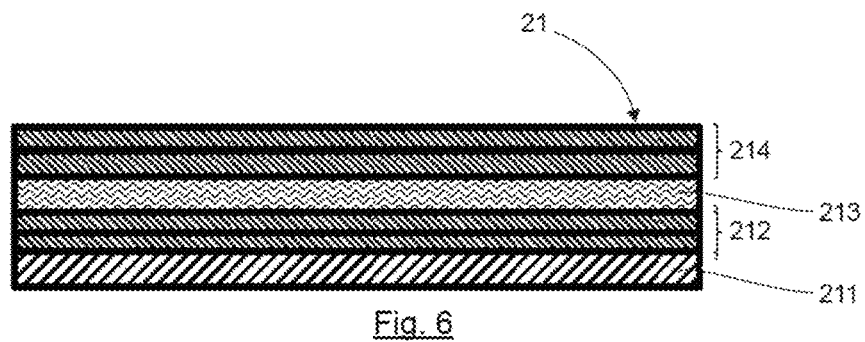
FIG. 6 is a diagrammatic cross-sectional view illustrating the different layers of the protective casing of the protective device according to an embodiment.

According to a particular implementation, the composite casing 21 is a lightweight sandwich structure consisting of a compact stack of several layers, including one or more structural layers of glass fibres and matrix, for example epoxy, arranged on either side of at least one structural layer of plywood or of a material having specific properties (density, Young's modulus, compressive strength of the same order of magnitude) and a non-structural layer for protection against aggregates intended to be oriented towards the stress side (FIG. 6).

In the example in FIG. 6, the casing 21 is a composite structure composed of several layers of different materials:
- a non-structural layer 211 for protection against the aggregates: this layer, intended to be oriented towards the stress side, can be destroyed without affecting the performance;
- structural layers 212, 214 (named structural due to a multi-material assembly responding to mechanical properties). The strength to stiffness ratio of the materials in these layers is adapted to the target to be protected. Examples: glass or carbon fibres;
- a structural layer 213 of plywood, called core (named structural because it consists of several sheets of wood veneer glued to each other crossing the direction of the wood grain).

The function of the outer glass fibre layer(s) 211 (exposed to the blast, and therefore oriented towards the stress side) is to protect the floor 11 from flames and projections of materials (aggregates) thanks to its/their high resistance to physical and thermal shocks. This/These outer layer(s) of centimetre thickness serve(s) as an initial barrier and is/are intended to prevent or limit the penetration of the aggregates projected by the blast, in order to sufficiently reduce the risk of damage to subsequent layers 212 (outer structural skin) and 213 (casing core).

The number of layers is variable and is closely linked to the type of stresses considered and the application scope. For example, a prototype developed and tested by the inventors includes 55 layers of glass fibre. Depending on the thickness allowed, the number of layers can reach 240 or even more.

The thickness of each of the glass fibre 212, 214 and plywood 213 layers can be greater or lesser depending on the design requirements, i.e., with respect to the maximum threat level considered.

The core material, for example here plywood, is chosen to have, for a given low density (in the order of 100 to 1,000 kg/m3), a good rigidity in the three directions (a few GPA), a good shear resistance and a good compressive strength. It is a natural brake to the propagation of a wave and allows a continuous connection to the adjacent layers.

The plywood must be able to deform: by moving through the thickness of the casing, the wave causes a "swelling" and then a contraction effect which is preferentially located in the thickness of the plywood forming the structural layer 213 that acts like a bellows spring. This change in thickness causes a mechanical impedance mismatch favourable to the desired effect between the casing 21 and the connecting elements 22a, 22b, 23a, 23b and contributes to the resistance to the transmitted movement by reducing the peeling forces between the layers.

It should be noted that the mechanical properties of the composite structure can be symmetrical or asymmetrical depending on the type of stress against which protection is sought.

The arc shape of the protective structure avoids stress concentrations (no discontinuity), unlike a "V" structure present in the prior art.

Materials other than glass fibres may be considered for the structural layers 212, 214. For example, carbon fibres can be used.

In the example in FIG. 5, the elastomer (silicone, for example) connecting elements 22a, 23a are connected to elements 24a, 25a for fastening or supporting the casing 21 to the vehicle 1.

These fastening or supporting elements 24a, 25a take the form of longitudinal profiles, or beams, which are here arranged on the sides of the vehicle on either side of the composite casing 21.

In FIG. 5, the upper support is referenced 25a and is arranged under the body C of the vehicle 1. The lower support, referenced 24a, can be disassembled, which allows a quick change of the overprotection casing 21. The overprotection casing 21 is mounted with a pre-tightening adapted to the stress of the elastomer blocks forming the connecting elements 22a, 23a.

This same support 24a can be attached to the structure to be protected by screws or other devices that can shear automatically at a given level of force. If the stress exceeds a given level, once it has completely dissipated, the overprotection releases the stored elastic energy, which causes an action in the opposite direction on said members, causing them to shear. Supports 24a and 24b will be ejected, which will automatically decouple the overprotection from the structure to be protected.

The floor 11 on which the passengers' feet are intended to rest (FIG. 4) takes the form of a lowered area, or bowl, allowing the total height of the vehicle to be reduced and the "z" dimension to be minimized without affecting the ground clearance of the vehicle (FIG. 5).

The clearances J1 and J2 (FIG. 5) are such that they allow free movement of the overprotection casing 21.

The connecting elements 22a, 23a are arranged symmetrically with respect to the casing 21 and are rectangular in cross section in FIG. 5. The lower stud forming the connecting element 23a can be smaller than the upper stud forming the connecting element 22a. The overprotection casing 21 is positioned by pinching between these two connecting elements 22a, 23a.

The connecting elements 22a, 23a are able to deform so as to allow the rotation and translation of the casing 21 (notion of elasticity), to be able to absorb by deformation also part of the energy of the blast and to return the wave to the casing 21. In other words, the connecting elements 22a, 23a fulfil the articulation function and allow degrees of freedom, deforming without changing state.

These connecting means are compact and light. They avoid the use, for example, of links or ball joints forming connecting means in the solutions of the prior art. The connecting elements are compressible and are sized so as to withstand the stresses without deteriorating under the high pressures generated during the explosion of a mine. Their Poisson's ratio is almost equal to 0.5 in one particular example.

The cross section of the connecting elements (beam or blocks) is square or rectangular, for example.

Various examples of connecting elements are described hereinafter in relation to FIGS. 7 to 12. In several of these examples, they are in the global form of a parallelepiped.

It is noted that, in general, the choice of the cross section of the connecting element (23, 23-1, 23-2, 23-3, 23', 23", 23''', 23'''') is guided by the static and dynamic properties of the elastomer, the geometry of the overprotection and its mode of operation, the nature of the threat . . . .

Furthermore, the stiffness of the support (24, 24', 24") can be obtained by any common means (box structure, profile with adapted inertia . . . ). The support (24, 24', 24") can be metallic but also composite, for example.

In FIG. 7, the connecting element 23 takes the form of an elastomer block with a rectangular cross section of 255 mm*135 mm and which extends continuously along the length of the overprotection casing 21. The upper face constitutes the bearing face against the casing 21, the lower face being housed in a support 24 (arranged on the frame side) of appropriate stiffness according to the size of the overprotection casing 21 (and thus of the vehicle), the threat . . . .

The rims 241a, 241b on the support 24 enable the lateral support of the block constituting the connecting element 23.

FIG. 8 is a variant of the solution in FIG. 7 in which the connecting element consists of several spaced blocks 23-1, 23-2, 23-3 (the choice of three blocks is illustrative only), the number of which depends, for example, on the size of the vehicle (or of the system to be protected) and the threat.

FIG. 9 is a variant of the solution in FIG. 7, in which the connecting element 23' has chamfers on its face oriented towards the frame side, and the support 24' has a complementary shape. There could be chamfers on the other face oriented towards the overprotection side (not shown here).

FIG. 10 is another variant of the solution in FIG. 7 in which the connecting element 23" has four rounded corners, the support 24' having a complementary shape.

In FIG. 11, the connecting element 23''' has a trapezoidal cross section, the reduction of the bearing section allows for greater flexibility of lateral movement.

In FIG. 12, the connecting element 23'''' has an ellipsoidal cross section, the support 24" having a curved complementary shape.

The operation of the protective device 2 according to the invention is as follows.

The protective device 2 according to the invention behaves totally differently from known devices during the detonation of a mine.

Known devices must first of all be mechanically resistant to prevent tearing. They can take advantage of a V or curved shape to deflect part of the blast or even use plastic deformation to absorb a small part of the energy, but they are heavy and are not designed to be able to deform significantly in the elastic domain (thus without major damage) during the period of stress, which limits very strongly the "deconcentration" effect. Finally, they do not take advantage of the dynamic benefits of a multi-material, multi-layer system based on the stacking of layers with very different properties (coefficient 5 to 10 on thicknesses and Young's moduli in the plane, for example).

While a small part of the blast is deflected by the arc convex shape of the casing 21, most of the stress received vertically (in the particular case of a military land vehicle) causes a progressive flattening of the casing 21 towards the floor 11 as well as a progressive lateral movement of the ends of the arc.

This mechanical deformation has a slower kinematics than known devices.

When an explosion occurs under the vehicle, the pressure is exerted on the casing 21 that is strong enough to elastically deform and also stop shrapnel and projections. The dimensions of the casing 21 give it an appropriate rigidity allowing it to distribute a part of the received energy on the lateral connecting elements 22a, 22b, 23a, 23b.

Thus, the forces of the explosion are transferred through the casing 21 substantially to the sides of the vehicle. The explosion is largely dispersed and absorbed by the composite casing 21. Following the impact, the arc-shaped casing 21 oscillates and can take a quasi-planar shape before taking a shape with a smaller radius of curvature than initially and finally, after several oscillations, return to its initial curved position.

The beams constituting the lateral connecting elements are sized to deform in bending and compression in a relatively localised manner and allow (with a reduced footprint) to consume part of the energy produced by the blast from the mine and to return some of it to the casing 21.

The beams are made of elastomer, silicone or neoprene for example. The silicone returns a part of the wave and transfers the rest to the structure to be protected. In addition to the delay effect mentioned, there is therefore a reduction. Indeed, the silicone behaves like a semi-free edge (two media with very different properties): the wave cannot go any further and therefore returns largely to the overprotection casing. Silicone is therefore involved in trapping the waves in the overprotection. The wave will therefore make many round trips before starting to feed the silicone. The vibratory response of the floor is very gradual, with small steps, and offset in time.

It is thus possible to ensure effective protection of the vehicle floor 11 with a relatively low protection thickness comprised between 100 mm and 200 mm, which protects the floor 11 of vehicles with reduced ground clearance.

The device of the invention notably has the following advantages:

Strength, flexibility and shear strength,
Multi-material and multi-layer arc structure that can elastically support the stress among others because it does not present any geometrical discontinuity in the area of interest (no weak link),
Protection against ejecta, aggregates, and more generally projections commonly encountered in this type of stress (shield function),
Elastomer beams allowing infinite compression,
Low mass: lightness and mobility,
Compact assembly (small footprint),
No metal parts (no corrosion problems), and
Low or no maintenance.

The protective device 2 of the invention thus has a reduced weight and a relatively reduced total thickness without penalising the protective performance (the thickness of the composite casing 2 is a compromise between weight and short response time).

As an example, a prototype made at ⅓ scale withstood an acceleration of 8,000 g ("g" being the acceleration of standard gravity) and a velocity of the projections (part one of the stress) in the order of 1,700 m/s.

Those skilled in the art will size the protective device 2 according to the characteristics of the threat against which they want to protect the vehicle as well as according to the characteristics of the vehicle itself.

It is further understood that the protective device 2 of the invention can be configured to protect other parts than a vehicle floor, or even other than a vehicle.

Other geometries of the casing 21 are possible.

In general, all convex shapes with constant or variable curvature are possible.

The curvature of the casing 21 is not essential, however. It was thus verified that when the radius of curvature is large, i.e. when the casing 21 is flat or almost flat, the performance is only slightly degraded. However, a curvature of the casing 21 improves the effectiveness of the protective device 2 by providing rigidity at a lower cost, avoiding stress concentration at one point, and naturally filtering some of the normal forces at the point of explosion.

The radius of curvature of the casing 21 can be equal to 2.4 m or 4.8 m, for example for a vehicle of width equal to 2.5 m. A larger radius of curvature allows for a smaller footprint, but slightly reduces the efficiency of the system, while still being more efficient than a flat steel solution with the same parameters (all else being equal).

A curved casing 21 is of further interest. Indeed, the curved shape induces an angle of inclination of the contact surface of the casing 21 on the connecting elements 24a, 24b, 25a, 25b. This angle favours deployment, i.e., the resistance to lateral movements is lower (and the echo of the wave transmitted to the connecting elements is even lower). Indeed, the radius of curvature changes during the blast and this change favours the shearing of the connecting elements. By deforming, the connecting elements transmit less movement to the floor 11.

The stacking of the layers of the casing 21 has a vulnerability to shear at the interlayers which tend to propagate cracking when the edges are damaged. The inventors had the idea to bring the layers of the casing 21 upwards to avoid delamination of the casing: the significant change in direction of the layers improves the mechanical resistance. Thus, in edging zones, the opposite side edges of the casing 21 are cleverly folded to prevent delamination.

FIGS. 13A and 13B show the contribution of such anti-delamination edging zones zb.

FIG. 13A shows a casing 21 without edge under the effect of the shock wave O (blast forming an overpressure zone) caused by the explosion of a mine M buried in the ground S. With the same load, the movement of the casing 21 with edging (zb zone) (FIG. 13B) is lower by a value "d" than the movement of the casing 21 without edging zone (FIG. 13A).

The movement under the effect of the blast is reduced for a casing with edging, as is the risk of critical delamination (complete break of the overprotection).

FIG. 14 illustrates a first edging solution, only one side edge of the casing 21 being shown. It is noted here that the upper structural layer 214 is folded down and the lower structural layer 212 is folded up so that the skins overlap at the side edges of the core 213.

The core is a structure comprising alternating layers of plywood or equivalent materials and layers of several composite materials.

In the example in FIG. 15, the upper structural skin 214 can be distinguished and it can be seen that the lower structural skin or layer 212 raises, which contributes to the edging function (press fit) so that the bond between the composite part (composite plies 213a) of the core (the core 213 being constituted of n stacks 213a and 213b (plywood ply or other material with similar properties)) and the lower structural skin 212 is greatly improved. The non-structural layer 211 protecting the casing 21 also raises in the same direction as the structural lower skin 212.

In the example in FIG. 16, each ply of the core 213 and the upper skin 214 undergoes multiple direction changes, which reduces the risks of delamination. The non-structural layer 211 protecting the casing 21 raises in the same direction as the structural lower skin 212.

The peripheral crown 215 UD has a movement blocking function. In other words, it prevents movement perpendicular to the plane of the layer.

The envelope 211 (subjected to impacts, flames . . . ) forming the non-structural layer protecting the casing 21 against the aggregates is damageable and/or ablative. It is also, in the solution in FIG. 16, bent on its lateral edges. This envelope is made of a glass mat and an epoxy resin, but it could also be a polyurethane or a filled/reinforced elastomer. This non-structural protective layer may incorporate metal or ceramic tiles to improve puncture resistance.

FIG. 17 is a top view showing the principle of the tiles: about 100 mm square, separated by a layer of mat in each tile layer. The numerical references 100 to 400 correspond to the stacking order of the tiles. In other words, tiles 100 are stacked before tiles 200, which are themselves stacked before tiles 300 . . . . In short, the tiles can move relative to each other without really providing any additional stiffness. The overlapping ensures a global coverage.

It is important to note that this edging acts as a frame containing the plies in case of delamination in the current zone (zone located inside the containment frame). It therefore adds a function, that of limiting the risk of projection of complementary elements in case the threat is much higher than the maximum threat, which could end up damaging the overprotection.

An important technical effect of the invention is that the protective device functions as a blast wave trapping mechanism. The speed of propagation of the wave in a material is proportional to the Young's modulus of this material. To counter the speed of propagation of the wave, a material with a very low Young's modulus is required. The Young's modulus of the protective structure varies between 10 MPa and 200,000 MPa depending on the layer.

By way of comparison, the Young's modulus range of stiffer materials currently used in overprotection extends from 3,000 MPa to 200,000 MPa depending on the layer.

The static Young's modulus of the different layers of the casing is, for example, equal to:
  about 10 MPa for elastomer;
  about 6,000 MPa for a glass mat, quasi-isotropic in the plane;
  about 5,000 MPa for a plywood core, quasi-isotropic;
  about 21,000 MPa for a glass fabric ply in the fibre directions;
  about 36,000 MPa in the fibre directions, 7,000 MPa in the transverse directions, for UD glass;
  about 200,000 MPa for steel scales.

As previously mentioned, one of the desired properties is the strength to stiffness ratio of the structural layers corresponding to references 212 and 214 in FIG. 13, which in the case of a UD glass is around 0.035 in tension and 0.023 in compression. In the case of a HS carbon, these ratios are respectively 0.022 and 0.014 (about −40%/glass). This both explains the interest of glass fibre and illustrates the potential of using other fibres.

It is important to specify that the protective casing 21 is not embedded: the same mechanical principle as for bridge abutment is applied.

A damping system can be introduced by selecting a soft material that can be an ultra-damping rubber.

The connecting elements 22a, 23a can be held on either side of the casing 21 in different ways, and in particular by reversible attaching means. Thus, according to a particular implementation illustrated in FIG. 18, this holding is done by pinching, by a screw-nut system.

A casing 21 having an elliptical arc shape can also be considered.

The invention claimed is:

1. A protective device for protecting a mobile or static structure against a blast from an explosion or detonation and associated projections of material, the protective device comprising:
  at least two connecting elements; and
  a protective casing made of several materials, said protective casing being located at a distance from the structure to be protected and connected to said structure by an elastomer connection, said protective casing being positioned by being pinched between the at least two connecting elements and being elastically deformable so that it can deform elastically for a duration of stress induced by the blast by oscillating to spread energy of the blast in several directions over a surface of the protective casing and over time, and then to return completely or partially to an original shape of the protective casing after a period of time, wherein said protective casing is mounted on the elastomer connection by a removable attachment, wherein said removable attachment has a calibrated breaking level.

2. The protective device according to claim 1, wherein said protective casing has materials whose Young's moduli are comprised between 1,000 and 200,000 MPa in quasi-static.

3. The protective device according to claim 1, wherein said protective casing comprises a multilayer structure.

4. The protective device according to claim 1, wherein said protective casing comprises a first protective layer composed of several materials to protect against projections of materials associated with said blast, said first layer being oriented towards an explosion blast side.

5. The protective device according to claim 1, wherein said protective casing comprises a multilayer structure having at least a first layer of material having a Young's modulus comprised between 1,000 and 10,000 MPa, a first face of which oriented towards the structure to be protected is covered by at least one structural layer and a second opposite face of which is covered by at least one other structural layer.

6. The protective device according to claim 1, wherein said protective casing comprises a multilayer structure, and wherein ends of at least one part of the multilayer structure of said protective casing are bent.

7. The protective device according to claim 1, wherein the elastomer connection comprises continuous or spaced supports extending at a periphery of the protective casing.

8. A vehicle comprising at least one protective device according to claim 1.

9. The vehicle according to claim 8, wherein the vehicle is a land vehicle comprising a floor under which the protective device is arranged.

10. The protective device according to claim 1, wherein the at least two connecting elements comprise at least one longitudinal connecting element extending parallel to the protective casing.

11. A vehicle comprising:

a floor; and a protective device mounted under the floor for protecting the vehicle against a blast from an explosion or detonation and associated projections of material, the protective device comprising:

at least two connecting elements; and a protective casing made of several materials, said protective casing being located at a distance from the floor to be protected and connected to said floor by an elastomer connection, said protective casing being positioned by being pinched between the at least two connecting elements and being elastically deformable so that it can deform elastically for a duration of stress induced by the blast by oscillating to spread energy of the blast in several directions over a surface of the protective casing and over time, and then to return completely or partially to an original shape of the protective casing after a period of time, wherein said protective casing is mounted on the elastomer connection by a removable attachment, wherein said removable attachment has a calibrated breaking level.

12. The vehicle according to claim 11, wherein the at least two connecting elements comprise at least one longitudinal connecting element extending parallel to the protective casing.

* * * * *